United States Patent [19]
Hirata

[11] Patent Number: 5,781,899
[45] Date of Patent: Jul. 14, 1998

[54] IMAGE INDEX PRODUCTION METHOD AND IMAGE INDEX PRODUCTION SYSTEM FOR IMAGE STORAGE AND MANAGEMENT SYSTEM

[75] Inventor: Kyoji Hirata, Tokyo, Japan

[73] Assignee: NEC Corporation, Tokyo, Japan

[21] Appl. No.: 548,728

[22] Filed: Oct. 26, 1995

[30] Foreign Application Priority Data

Oct. 27, 1994 [JP] Japan .................................. 6-263756
Apr. 26, 1995 [JP] Japan .................................. 7-101979

[51] Int. Cl.$^6$ .................................................. G06F 17/30
[52] U.S. Cl. ................................................ 707/6; 707/102
[58] Field of Search ............................. 395/605, 606; 707/6, 102

[56] References Cited

U.S. PATENT DOCUMENTS

| | | | |
|---|---|---|---|
| 5,361,204 | 11/1994 | McCollough et al. | 395/792 |
| 5,465,353 | 11/1995 | Hull et al. | 395/605 |
| 5,499,366 | 3/1996 | Rosenberg et al. | 395/605 |
| 5,504,884 | 4/1996 | Kyuma et al. | 395/605 |
| 5,544,352 | 8/1996 | Egger | 395/605 |
| 5,546,572 | 8/1996 | Seto et al. | 395/605 |
| 5,546,578 | 8/1996 | Takada | 395/605 |
| 5,548,700 | 8/1996 | Bagley et al. | 707/540 |
| 5,579,471 | 11/1996 | Barber et al. | 395/326 |
| 5,652,881 | 7/1997 | Takahashi et al. | 707/104 |

FOREIGN PATENT DOCUMENTS

| | | |
|---|---|---|
| 4-060770 | 2/1992 | Japan . |
| 4-241684 | 8/1992 | Japan . |
| 4-307668 | 10/1992 | Japan . |

OTHER PUBLICATIONS

Ioka, A Method of Defining the Similarity of Images on the Basis of Color Information, Technical Report, IBM Research, Tokyo Research Laboratory, 24 pages, Nov. 12, 1989.

Swain et al, Color Indexing, International Journal of Computer Vision, 7:1, 11–32 (1991), Jan. 22, 1991.

*Primary Examiner*—Wayne Amsbury
*Attorney, Agent, or Firm*—Foley & Lardner

[57] ABSTRACT

The similarity between zones which consist of one or plural pixels in an original image is measured, the similarity between the measured zones and the threshold of the similarity for integrating the zones consisting of one or plural pixels in the original image are received, and the original image is divided to make the similarity between respective zones lower than the threshold. The size of the zone-divided image for the image index is determined to make the number of total zones of the current divided image equal to the number of zones to be finally divided as an index. Attribute information on the zones of the zone-divided image is calculated to produce an index.

15 Claims, 20 Drawing Sheets

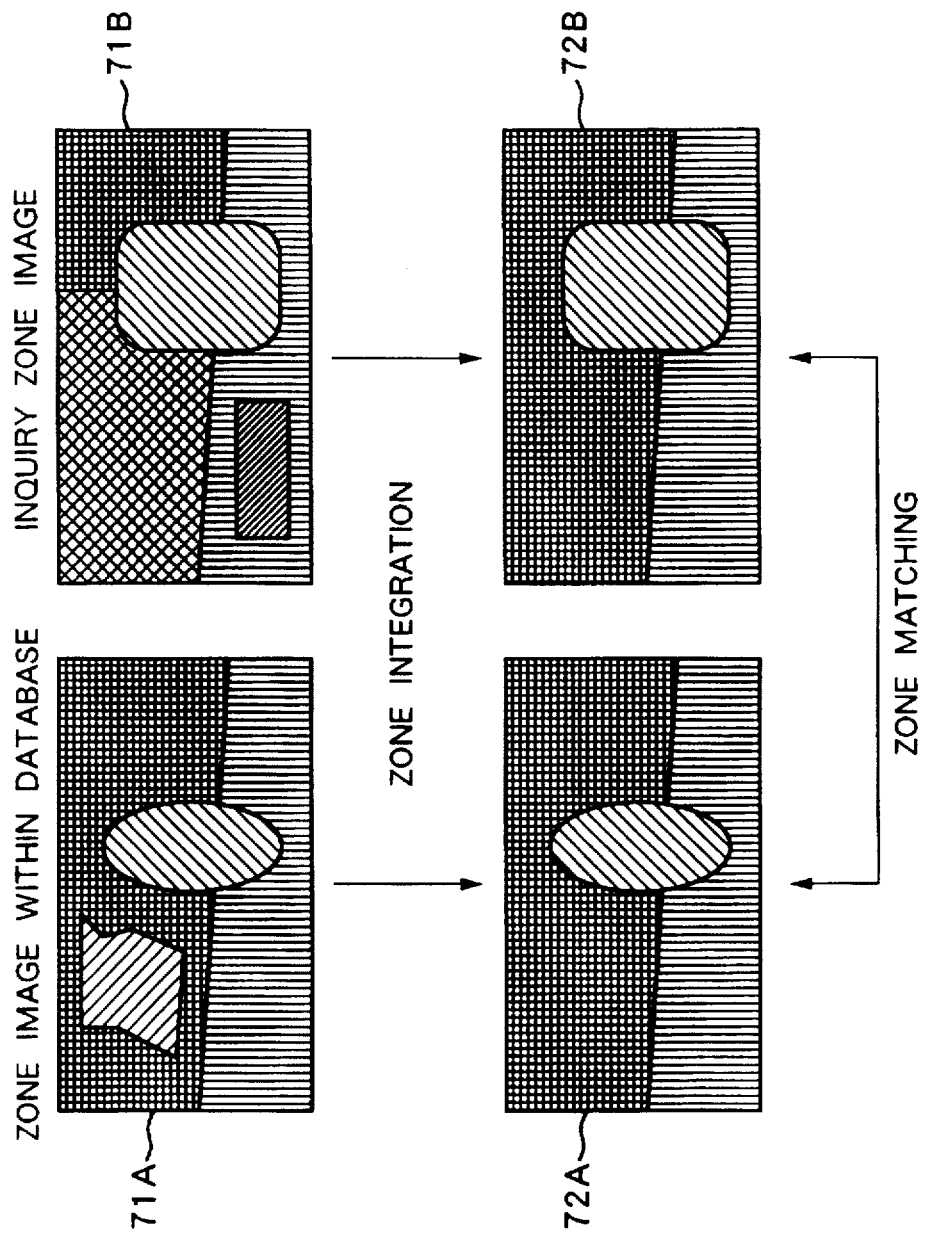

(a) RELATIVELY UNIFORMLY DIVIDED ZONES (b) NONUNIFORMLY DIVIDED ZONES

IMAGE INDEX PRODUCTION METHOD AND IMAGE INDEX PRODUCTION SYSTEM FOR IMAGE STORAGE AND MANAGEMENT SYSTEM

BACKGROUND OF THE INVENTION

1. Field of the Invention

The invention relates to an image storage and management system for storing and managing large amounts of image information in a computer, and to a method and system for producing an image index used to retrieve an image database system in order to retrieve and use an image.

2. Description of the Related Art

Conventionally, to retrieve image information from a database, retrieval is made based on bibliographic information such as input date, author name and image name. And, many free word keywords are assigned to images to make retrieval based on the keywords. In addition to the retrieval of information according to such text information, necessity of retrieval based on visual characteristics unique to images is increasing.

Demands for retrieval based on visual characteristics unique to images include retrieval based on spatial properties and structural information of images and retrieval based on color information. To realize such retrieval based on visual characteristics, there is proposed a method in that such characteristics are extracted from an original picture, the extracted characteristics are stored as a brief image (describing the outline of the original picture), and when retrieved, the brief image is quickly matched with an inquired image presented by a user (Japanese Unexamined Patent Publication (Kokai) No. 4-60770, "Image Retrieval Method using Brief Image and Method").

FIG. 20 is a function block diagram showing one example of a conventional image retrieval system using a brief image. This image retrieval system using a brief image comprises an input 181 for entering image retrieval conditions and directions for a required image, an image storage 182 for storing image information, a brief image storage 183 for storing images smaller than original images including the shapes, colors, sizes and positions of component elements, an image collating section 184 which receives the retrieval conditions from the input 181 to match with the brief images in the brief image storage 183 and to pick up candidate images to be retrieved, an image display 185 which receives the candidate images from the image collating section 184 and shows a result, and an output 186 which selects the image shown on the image display 185 from the image storage 182 to output according to the instructions from the input 181.

The above method, however, is not easy to automatically determine to generate and accumulate image indexes having what size and resolution to enable efficient retrieval, and requires a system constructor to previously examine types, numbers and similarity of images to be accumulated in the database in order to determine an optimum index.

SUMMARY OF THE INVENTION

It is a first object of the invention to provide an image storage and management system, an image index production method, and an image index production system which can produce image indexes to realize retrieval which does not depend on types, numbers or similarity of images to be entered.

It is a second object of the invention to provide an image storage and management system, an image index production method, and an image index production system which can retrieve from an image storage and utilization system with reference to visual clues possessed with respect to images of a user and applicably select an image index in accordance with external conditions such as input numbers.

It is a third object of the invention to provide an image index production method and an image index production system which can provide an effective image index size depending on an image, facilitate to produce an image index according to circumstances, and improve a relevance ratio to the retrieval by a user.

According to the first aspect of the invention, an image storage and management system for an image database comprises:

an image input means for entering an original image;

an image storage means for storing said entered original image;

a zone divider means for dividing a zone according to the visual characteristics of said image and producing zone division information;

a block divider means for dividing said original image into a gridded form and producing division information;

an image index production means for receiving said division information and said zone division information, giving a representative zone number to each grid, arranging the representative zone numbers, extracting zone attribute information containing color information of each zone number for said divided zones, and describing image index information; and an image index storage means which stores said image index information.

In the preferred construction, the zone divider means comprises a means for dividing said original image into a plurality of blocks, a means for judging inequalities of the image per block, a contractor means for contracting said original image to change one block into one pixel, a means for extracting hue and brightness information from said contracted image, and a means for dividing a block, which is judged to have small inequalities, into a prescribed number of zones according to the corresponding hue and brightness information and coordinate information, and adding information on a block having large inequalities to the divided result to determine a zone-divided image.

In such case, one and the same zone number is given to pixels having the same attribute information per said zone, a frequency histogram of pixels belonging to said zone which corresponds to said grid is made, a zone having the maximum number of pixels is determined as the representative zone of the grid, and the zone number of said representative zone is determined to be the representative zone number of said grid.

In the preferred construction, the number of blocks having the original image divided into the gridded form is changed according to the types of the original image to describe said image index in an array having a different size per the original image.

The image storage and management system may further comprise an original image and index corresponding means for corresponding said original image index with said original image, a means for entering an inquiry image for retrieval, a similarity judging means for judging the similarity between said inquiry image and the image indexes in said image index storage means and selecting an image index according to the similarity, and a means for specifying the original image corresponding to the selected image index and outputting the original image from said original image and index corresponding means.

In such case, the similarity judging means comprises a zone integrating means for extracting mutually matching zones between the inquiry image and the image index to correspond both images to each other, a means for deriving the similarity of shapes between said corresponded images, a means for deriving the similarity of colors between said corresponded images, and a means for judging the similarity between said inquiry image and said image index according to said similarity between shapes and said similarity between colors.

According to the second aspect of the invention, an image storage and management system for an image database comprising:

- a zone divider means for dividing a zone according to the visual characteristics of an original image;
- a block divider means for dividing said original image into a gridded form;
- an image index production means for giving a corresponding zone number to each grid to arrange the zone numbers, and producing an image index having attribute information, which contains color information per said divided zone, corresponding to said each grid; and
- an image index storage means for storing said image index information.

According to the third aspect of the invention, an image index production system comprising:

- an image input means for entering original image information;
- a zone-to-zone similarity deriving means for measuring the similarity between zones which consist of one or plural pixels in an original image;
- a threshold storage means for storing a threshold of the similarity for integrating zones which consist of one or plural pixels in the original image;
- a zone divider means for receiving the similarity between zones from said zone-to-zone similarity deriving means and the threshold of the similarity from said threshold storage means, and dividing said original image to make the similarity between respective zones lower than the threshold;
- a final zone number storage means for storing the number of finally divided zones as an index;
- a zone number recorder means for recording the number of total zones of the current image divided by said zone divider means;
- an index array size determination means for determining the size of the zone-divided image from said zone divider means for an image index to make said number of total zones equal to the number of zones stored in said final zone number storage means; and
- an index output means for calculating attribute information on the zones of said zone-divided image to produce and output an index.

In the preferred construction, the index array size determination means receives the number of current zones from said zone recorder means, the number of final zones from said final zone number storage means and the zone-divided image from said zone divider means, contracts the size of the current zone-divided image, integrates one zone which is made of one pixel before contracting with other zones around it to decrease the number of zones, and determines the number of total zones to be a size equal to the number of zones stored in the final zone number storage means.

Also, the index array size determination means receives the number of current zones from said zone recorder means, the number of final zones from said final zone number storage means and the zone-divided image from said zone divider means, if said number of current zones is smaller than the number of final zones, determines the zone-divided image from said zone divider means to have a size of the image index, and if said number of current zones is larger than the number of final zones, contracts a size of the current zone-divided image, integrates one zone which is made of one pixel before contracting with other zones around it to decrease the number of zones, and determines the number of total zones to be a size equal to the number of zones stored in the final zone number storage means.

According to another aspect of the invention, an image index production system comprising:

- an original image storage means for storing original image information;
- a new image input means for entering a new image;
- an index production means for receiving an image to be registered from said new image input means and producing an image index;
- an index storage means for storing the image index;
- an index-to-index distance threshold inducing means for storing a threshold indicating the upper limit of the similarity showing a distance between image indexes;
- an index-to-index distance evaluation means for receiving a candidate index for new registration from said index production means, receiving from said index storage means the index information on images stored in said original image storage means, calculating a distance from the candidate index for new registration, and inducing an image index from the index storage means, which is similar to the newly registered index at a level exceeding the threshold;
- an index size changing means for receiving from said index-to-index distance evaluation means the index for new registration and the image index which is similar to the index for new registration at a level exceeding said threshold, receiving original image information corresponding to said image index from said original image storage means, and changing the array size to prevent said index-to-index distance from resembling over the threshold thereby producing an image index; and
- an index input means for receiving the image index changed by said index size changing means and renewing the image index stored in the index storage means.

In the above-mentioned construction, the index size changing means changes the size of the index which has a smaller size between the index for new registration and said image index.

According to a further aspect of the invention, an image index production system comprising:

- an image storage means for storing images for producing an image index;
- an image selector means which selects a part or all of the images stored in said image storage means;
- an adaptive index production means for producing an image index having an optimum size per image selected by said image selector means;

an index size detector means for detecting the size of the image index produced;

an image index size determination means for using the detected results to determine a fixed index size;

a fixed size index production means for producing an image index of the determined fixed index size; and an index storage means for storing the image index produced by said fixed size index production means.

According to a further aspect of the invention, an image index production method comprising the steps of:

a step which measures the similarity between zones which consist of one or plural pixels in an original image;

a step which receives the similarity between said zones and the threshold of the similarity for integrating the zones consisting of one or plural pixels in the original image, and divides said original image to make the similarity between respective zones lower than the threshold;

a step which determines the size of said zone-divided image for the image index to make the number of total zones of the current divided image equal to the number of zones to be finally divided as an index; and a step which calculates attribute information on the zones of said zone-divided image to produce and output an index.

According to a still further aspect of the invention, an image index production method comprising:

a step which receives an image for new registration and produces an image index;

a step which receives a candidate image index for new registration, receives the index information on original images, calculates a distance from the candidate index for new registration, and induces an image index, which is similar to the index for new registration at a level exceeding the threshold which indicates the upper limit of the similarity indicating a distance between image indexes;

a step which receives the index for new registration and the image index which is similar to the index for new registration at a level exceeding said threshold, receives original image information corresponding to said image index, and changes the array size to prevent said index-to-index distance from resembling over the threshold thereby producing an image index; and a step which receives the changed image index and renews the image index.

According to a still further aspect of the invention, an image index production method comprising:

a step which selects a part or all of the images stored in an image storage means;

a step which produces an image index having an optimum size per image selected;

a step which detects the size of the image index produced;

a step which uses the detected results to determine a fixed index size; and a step which produces an image index of the determined fixed index size.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a view showing one example of an integrating process of an inquiry image and an image index zone.

DESCRIPTION OF THE PREFERRED EMBODIMENT

Figure 1:
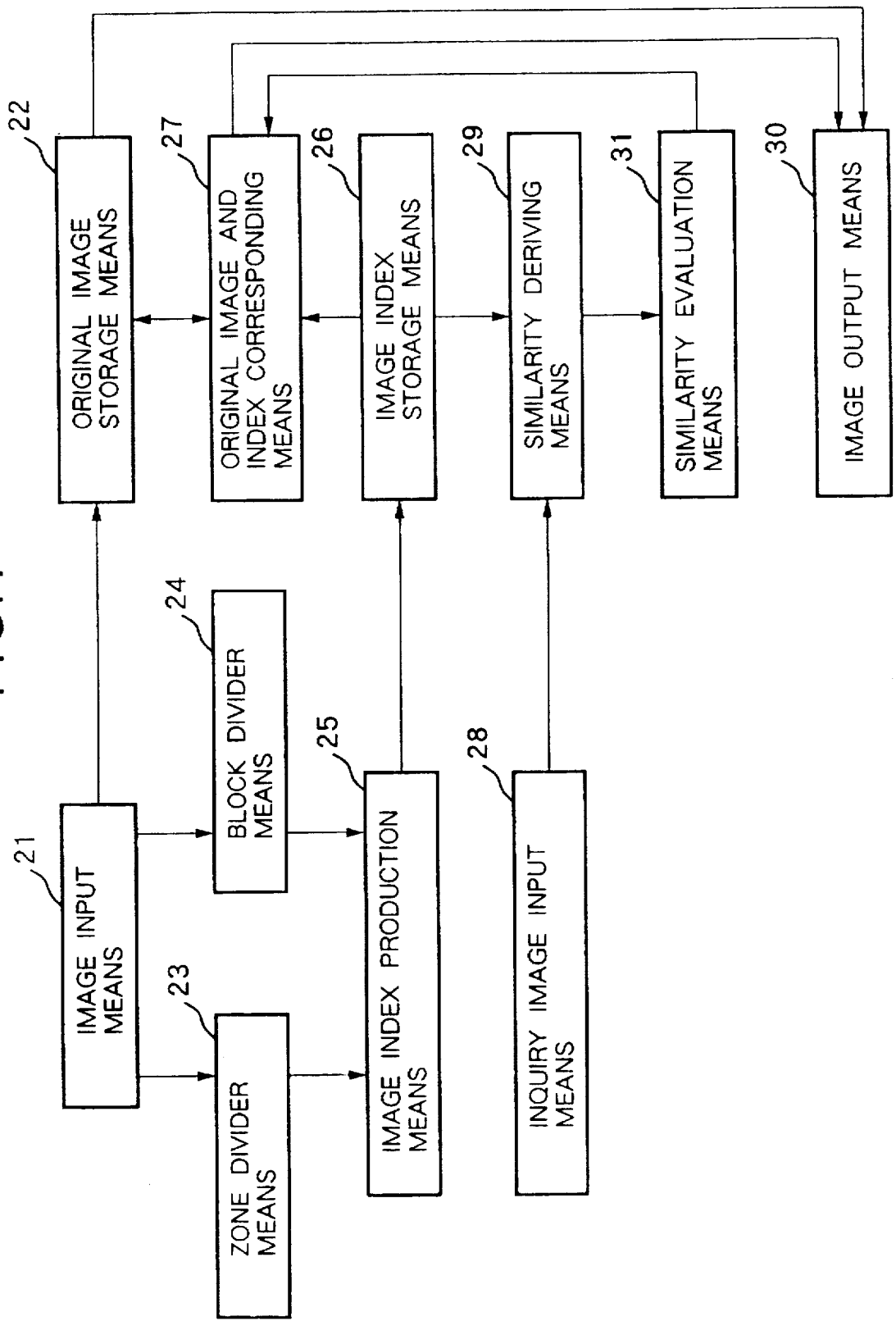
FIG. 1 is a function block diagram of an image storage and management system of the first embodiment of the invention.

Preferred embodiments of the invention will be described in detail with reference to the attached drawings. Description will made of an embodiment of an image storage and management system of the invention with reference to FIG. 1, FIG. 2 and FIG. 3. FIG. 2 shows an original image A for one picture, a divided image B prepared by dividing the original image into a gridded pattern, a zone-divided image C, and an image index D.

In FIG. 2, the original image A consists of "384*576" pixels. One single pixel of the zone-divided image C corresponds to 4*4 pixels of the original image A. Thus, the zone-divided image C has a size of "96*144" (pixels).

The pixels having the same attribute information (color components and others) of the zone-divided image C are given the same zone number. In FIG. 2, the zones given the same zone number are shown with the same pattern, and the zone-divided image C has a total zone of "6".

The divided image B has a grid number of "8*12" in FIG. 2, and 48*48 pixels form a single block (a zone surrounded by grids) in correspondence with the original image A. In the image index D, zone numbers (numbers 1 to 6 in FIG. 2) are given for respective grids of the divided image B, and attribute information such as color components is given to each zone number. For instance, the zone numbers 1 to 6 are given color component values (RGB values) such as (243, 232, 124), (34, 43, 157), . . . . These values are used for convenience of description, and the size of the zone-divided image C, the number of grids of the divided image B, the number of total zones and others are not required to have the above values.

The image storage and management system of the invention divides the original image into a gridded form, gives an individual representative zone number to each grid, (e.g., block) and determines zone attribute information corresponding to the representative zone numbers. In other words, the original image is divided into the gridded form, and each grid and the image index array are corresponded by the representative zone number. In this process, the zone-divided image of the original image is used.

For instance, pixels of the zone-divided image C corresponding to each grid are determined, and the frequency distribution of values (zone numbers) of the pixels of the zone-divided image corresponding to the grids is set for each grid. After setting the frequency distribution, the most frequent zone number is determined as the zone number representing its grid, and the representative zone number is given. Thus, the representative zone number is determined for each grid. Zone attribute information corresponding to the representative zone number is determined in view of the values of pixels of the original image corresponding to the grids having the same representative zone number. For example, the zone attribute information corresponding to the representative zone number is determined by obtaining a mean value of pixel colors. Thus, the representative zone number and the zone attribute information are determined with respect to each array corresponding to each grid of the image index D.

Figure 2:
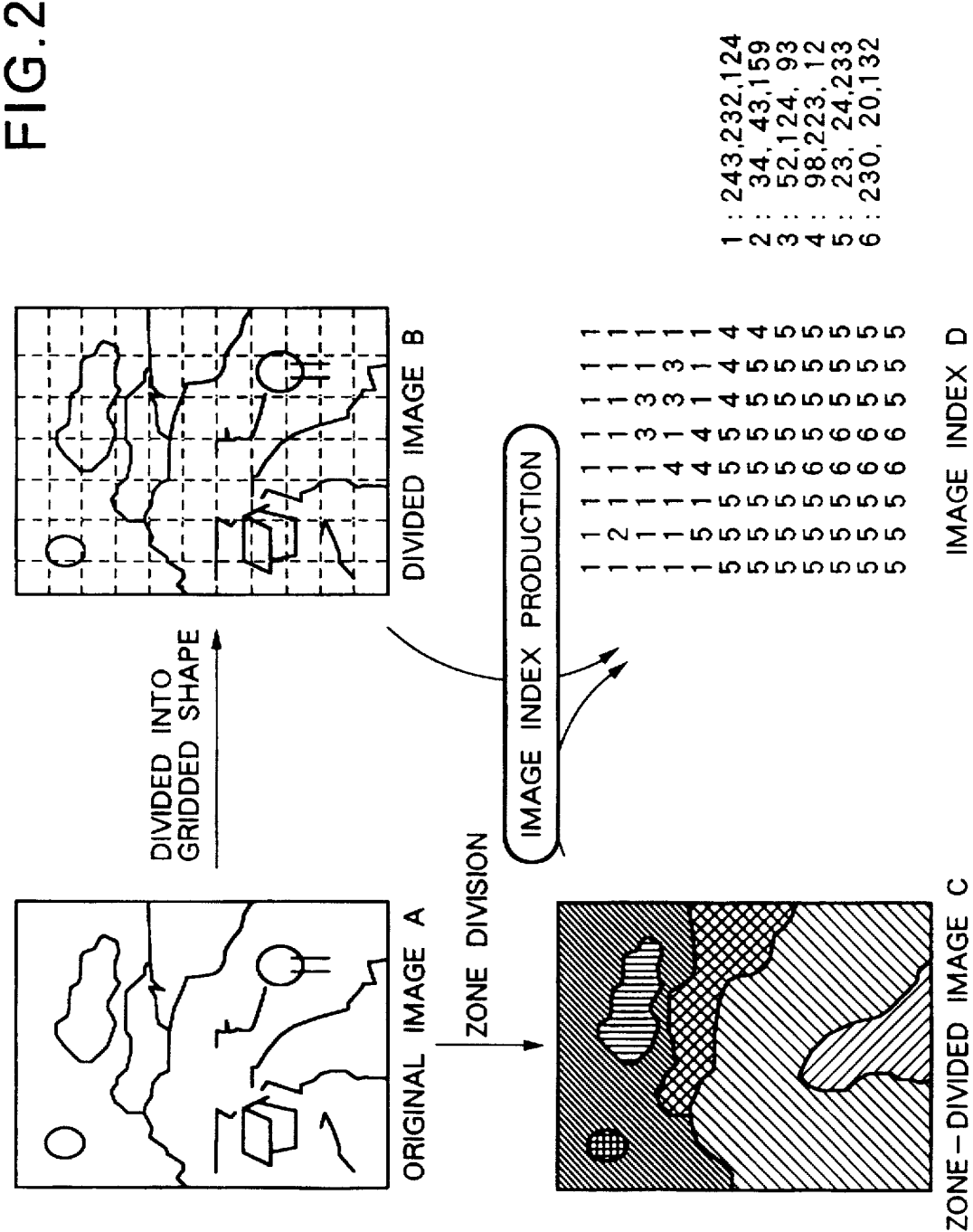
FIG. 2 illustrates examples of an original image, a divided image prepared by dividing the original image into a gridded pattern, a zone-divided image, and an image index.

FIG. 1 shows a function block diagram of the image storage and management system of the embodiment characterized by using the above index. A new original image is entered from an image input 21. The image input 21 is a scanner or camera for example. An original image storage 22 receives image information entered from the image input 21 and stores it as an original image.

A zone divider 23 divides the original image into several zones on the basis of visual characteristics such as color and edge information of each pixel of the original image.

To divide the zone by the zone divider 23, for instance, color components used in the image are requantized in RGB space (e.g., four red gradations, four green gradations, four blue gradations), and pixels indicated in the same color are determined as one zone (in this case, divided up to 4*4*4:64 zones). In the zone division by the zone divider 23, the zone may be divided taking texture into consideration as disclosed in Japanese Unexamined Patent Publication (Kokai) No. 4-307668, "Brief Image Production Method and System". The size (the total number of pixels) of the zone-divided image is not always required to be same with the original image or the number of grids.

The zone divider 23 in the above embodiment applies an index production method as described in Japanese Unexamined Patent Publication (Kokai) No. 4-307668, which is the brief image production method comprising dividing an image into certain zones to describe the position, size, color, shape and hue contrast conditions of the structures in the image.

Figure 4:
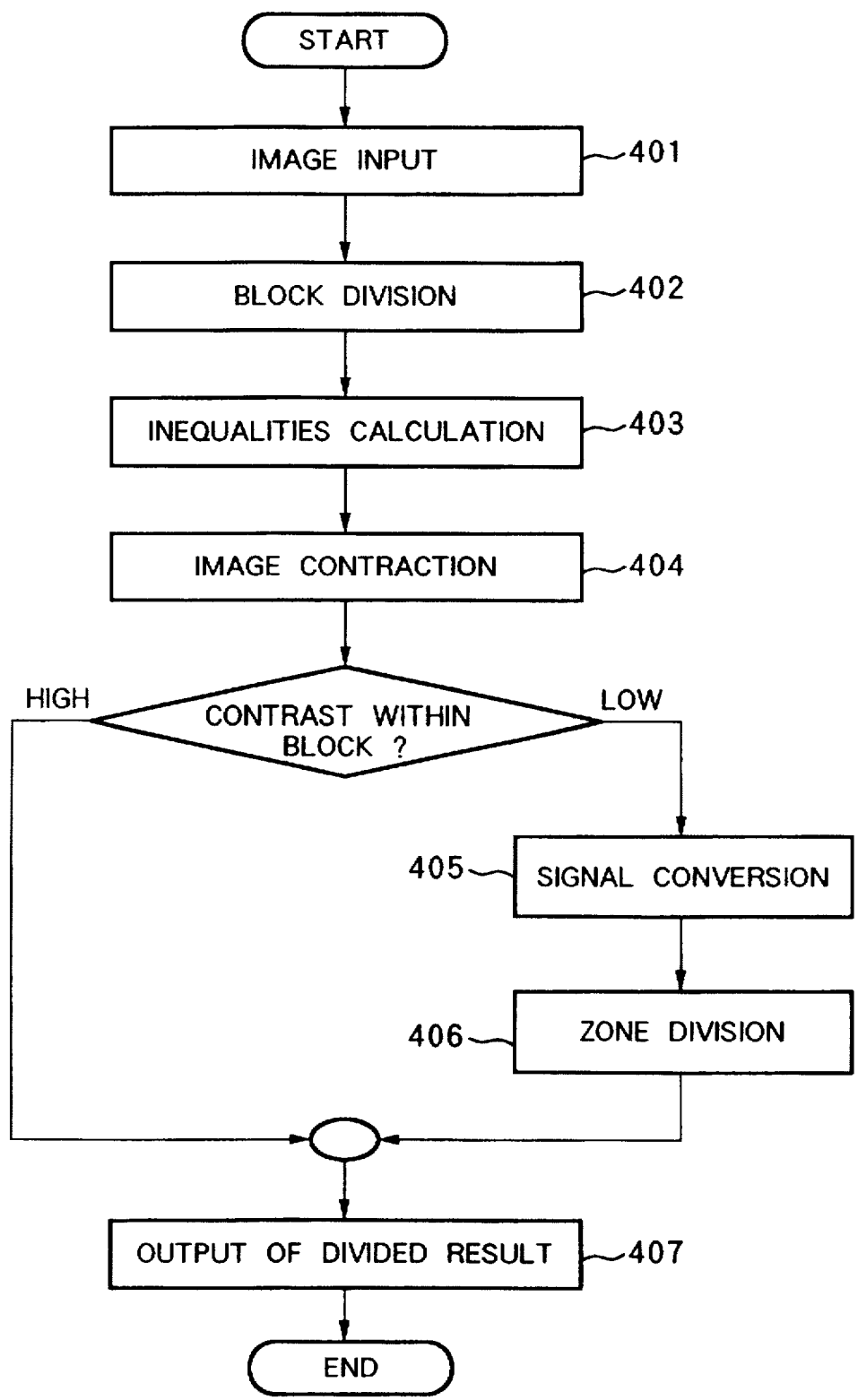
FIG. 4 is a flowchart showing steps processed by a zone dividing section.
Figure 5:
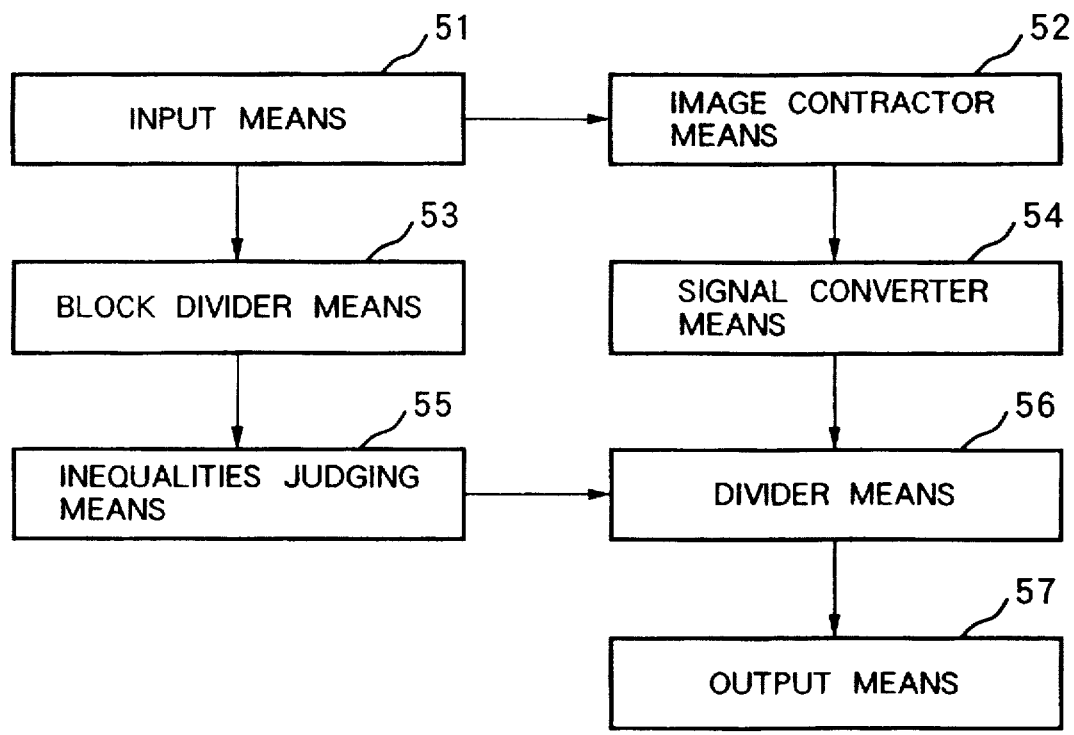
FIG. 5 is a block diagram showing a structural example of a zone divider of the first embodiment.

The zone divider 23 of the embodiment will be described with reference to FIG. 4 and FIG. 5. FIG. 4 is a flowchart showing the steps of zone dividing, and FIG. 5 is a block diagram showing a structural example of the zone divider 23. FIG. 5 shows that the zone divider 23 comprises an input 51, an image contractor 52, a block divider 53, a signal converter 54, an inequalities judging section 55, a divider 56, and an output 57.

The input 51 enters an image from the image input 21 (Step 401), and the block divider 53 divides the entered image into a block of "s*t" (Step 402). Values of s and t indicating the number of blocks show the size of the zone-divided image of FIG. 2. As an example of dividing, the image is subject to a direct sum division into a rectangle of "s*t". The values of S and t are set by a system constructor.

The inequalities judging section 55 receives the blocked image from the block divider 53, and measures the inequalities per block (Step 403).

To measure the inequalities, for instance, a hue component per block is measured, contrast per block is extracted according to the hue component, a specific threshold value is determined, and the magnitude of changes in contrast of the block is determined.

The image contractor 52 receives the image from the input 51 and contracts the image to make one pixel from one block (Step 404).

The image contractor 52 contracts the image by, for example, extracting a given one from the pixels of the block at random to make it the representative value of the block, or calculates the average of RGBs in each block as the representative value for the block.

The signal converter 54 receives the contracted image from the image contractor 52 and extracts hue and brightness information from the image (Step 405).

The divider 56 receives the hue and brightness information from the signal converter 54 about a zone which is determined to have small inequalities by the inequalities judging section 55 and divides into a predetermined number of zones according to the above information and coordinate information (Step 406).

The divider 56 makes, for example, a four-dimensional vector from the brightness, hue, X coordinate value and Y coordinate value and divides the vector data by a longest distance method to divide the zone.

And, a zone-divided result is determined by adding information on the zone having large inequalities to the divided result by the divider 56.

The output 57 outputs the obtained result as a zone-divided image to an image index production section 25 of FIG. 1.

Figure 3:
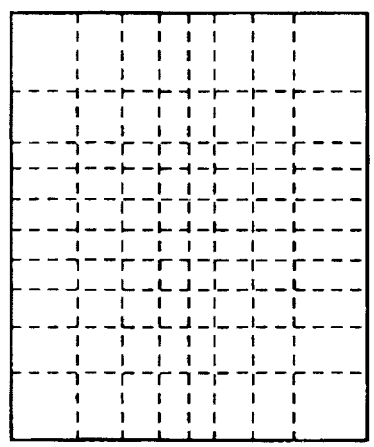
FIG. 3 illustrates an example of gridded pattern with different squares when an original image is divided.

A block divider 24 divides the original image into a gridded form. In this case, each grid size (grid interval) may be uniform as shown in FIG. 2, or may be different as shown in FIG. 3.

The image index production section 25 receives the division information from the block divider 24 and the zone division information from the zone divider 23, determines the representative zone number of each grid, arranges the representative zone numbers, extracts zone attribute information containing color information of each zone, and describes the extracted information as index.

The image index production section 25, for example, gets a frequency histogram of pixels having the zone numbers in the zone division image corresponding to each grid, determines the zone having the maximum number of pixels as the representative zone of the grid, and makes a zone number corresponding to the representative zone to be the representative zone number.

To attain color information of the zone attribute information, with respect to the zones recognized to be the same zones in the image index, the mean value of respective pixel values of the original image corresponding to the above zones is determined and expressed in RGB value.

An image index storage 26 receives image index information from the image index production section 25 and stores it. An original image and index corresponding section 27 corresponds the original image with the image index and stores them. For instance, they are stored in the form of a table. For instance, identification ID (intrinsic number or file name) of the original image and identification ID (intrinsic number or file name) of the image index are used to correspond in the form of a table.

A user of the database uses an inquiry image input 28 to retrieve and make an image. The image to be entered by the inquiry image input 28 may be an image directly drawn by the user with a drawing tool or may be entered externally by a scanner or camera. It may also be selected from the images stored in the original image storage 22.

A similarity deriving section 29 judges the similarity between the inquired image and the image indexes in the image index storage 26. In the similarity deriving section 29, the indexes are previously divided into certain zones.

The similarity deriving section 29 of the above embodiment employs one of the methods which measure the similarity among the images previously divided as described in Japanese Unexamined Patent Publication (Kokai) No. 4-241684, "Image Integrating and Matching Method", integrates the zones to clarify the corresponding relation of each zone and uses the integrated shape information and the color information prior to the integration with respect to the integrated zone.

Figure 6:
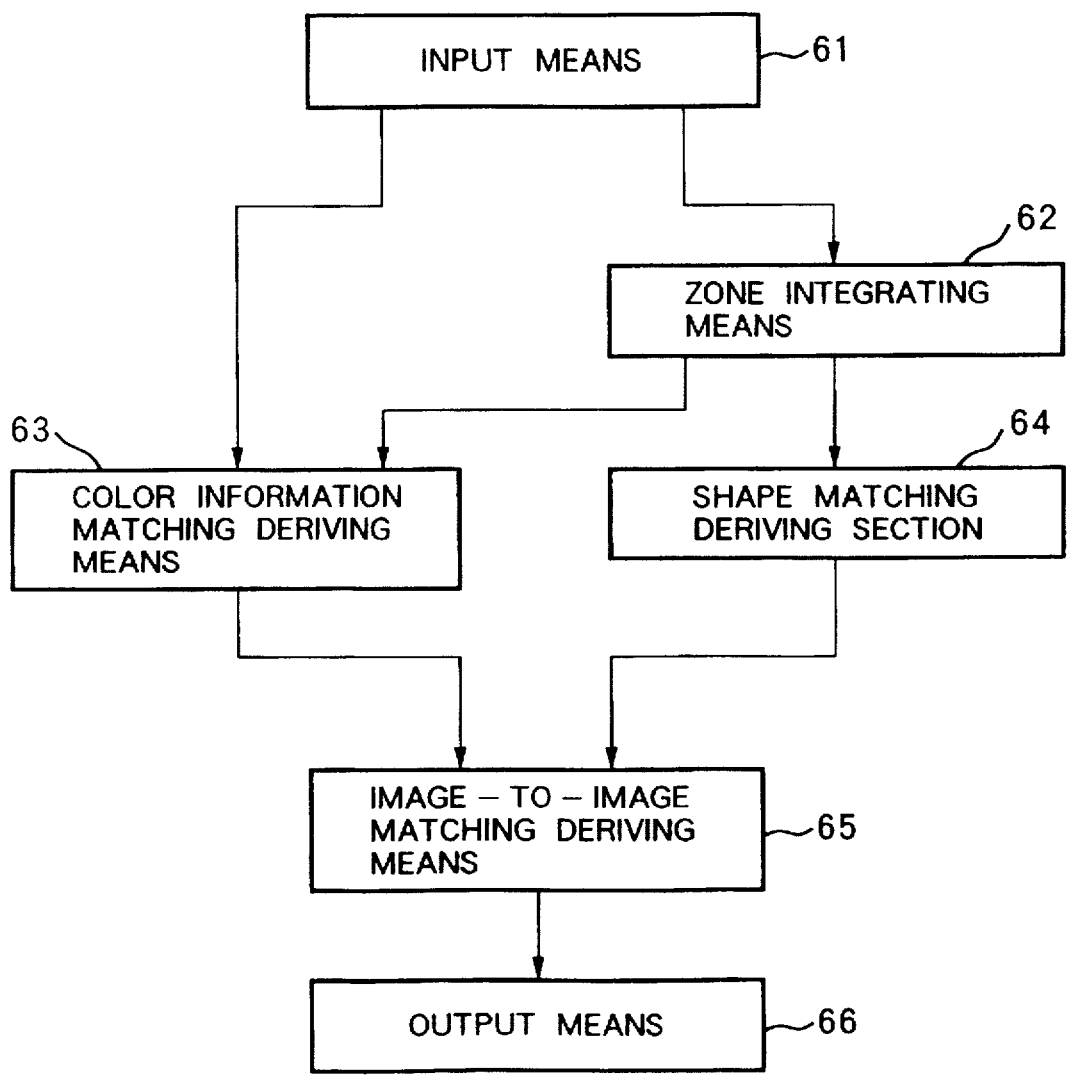
FIG. 6 is a block diagram showing a structural example of a similarity deriving section of the first embodiment.

FIG. 6 shows a block diagram of the similarity deriving section 29 of the embodiment for realizing the above method. In FIG. 6, the similarity deriving section 29 comprises an input 61, a zone integrating section 62, a color information matching deriving section 63, a shape matching deriving section 64, an image-to-image matching deriving section 65, and an output 66.

As shown in FIG. 7, the input 61 is used to enter a zone image indicated by the image index stored in the image index storage 26 and a zone image produced from the inquired image. These images are assumed to be an image 71A and an image 71B. The image 71A is obtained from the image index storage 26 and the image 71B from the inquiry image input 28 as shown in FIG. 1. The zone integrating section 62 repeatedly integrates the zones of the image 71A and the image 71B until each zone of these images is corresponds to each other.

Specifically, the zones of the image 71B which most match the respective zones of the image 71A are extracted, and the zones of the image 71A which most match the respective zones of the image 71B are extracted, then the zones are integrated on the basis of the corresponding relations. Images after the zone integration are indicated by 72A and 72B.

As shown in FIG. 7, after matching both images, the shape matching deriving section 64 measures the similarity of the shapes of the integrated zones.

For instance, the similarity of the shapes are derived from the overlapping of both images (e.g., the number of overlapped pixels). Specifically, the number of overlapped pixels of the corresponding zones of both images is indicated as scores of similarity, and a sum of scores of similarity of corresponding zones is calculated as the similarity of shapes. In this case, taking displacement into consideration, zones of one image are moved vertically and horizontally to overlap most the zones of both images, and the number of overlapped pixels is calculated.

The color information matching deriving section 63 enters each zone information before integrating the images 71A, 71B and color information representing the zone from the input 61, and reads the zone information of the integrated images 72A, 72B from the zone integrating section 62. And, the similarity of colors of the integrated zones is derived from the color-to-color similarity (e.g., a distance of RGB value) of color information used for the integrated zones.

The image-to-image matching deriving section 65 receives the color similarity of the integrated zones from the color information matching deriving section 63 and the shape similarity of the zones from the shape matching deriving section 64, and derives the similarity of the whole images by taking the above similarities into consideration.

The image-to-image matching deriving section 65 may determine a sum of scores of the similarity (similarity of shapes and colors) of each zone as the similarity of the entire image, or may assign weights on the basis of the number of pixels of each zone to derive the similarity of the entire image. And, the values of the color matching and shape matching may be simply added to determine the similarity of the entire image, or may be added after assigning weights to the scores of colors and shapes.

The output 66 outputs the similarity of the images 71A, 71B measured in the image-to-image matching deriving section 65 to a similarity evaluation section 31 shown in FIG. 1. One example of the process to integrate the zones of the inquired image and the image index is as shown in FIG. 7.

The similarity evaluation section 31 receives the similarity of each image index and an inquired image from the similarity deriving section 29, determines an image to be outputted according to the similarity, and informs to the original image and index corresponding section 27. The similarity evaluation section 31 selects an image index with high similarity (score).

The original image and index corresponding section 27 specifies the original image corresponding to the image index outputted from the similarity evaluation section 31 and informs an image output 30. The image output 30 receives from the original image and index corresponding section 27 information on which original image has been selected, receives its original image information from the original image storage 22, and shows the retrieved result to the user. The original image and index corresponding section 27 has capability of mutually referring to original image specifying information (ID) and index specifying information (ID), and manages the original image specifying information (ID) and the index specifying information (ID) in the form of a table.

The second embodiment of the image storage and management system of the invention will be described with reference to FIG. 8A, FIG. 8B and FIG. 9. Various images are entered into the image storage and management system. It is improper to assign an array having the same resolution to two types of zone-divided image (the number of grids in block division) as shown in FIG. 8A and FIG. 8B.

Figure 8A:
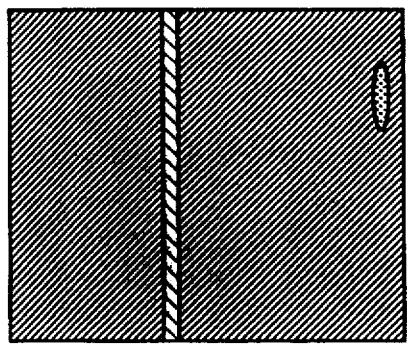
FIG. 8A illustrates an example of a zone-divided image whose zone is relatively evenly divided.
Figure 8B:
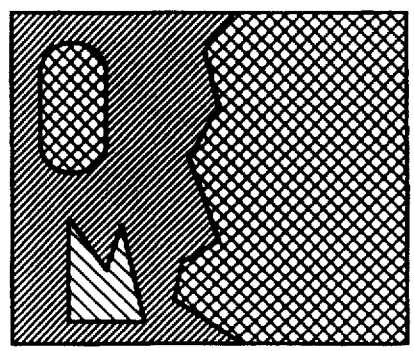
FIG. 8B illustrates an example of a zone-divided image whose zone is unevenly divided.

FIG. 8A shows a relatively uniformly zone-divided image, and FIG. 8B shows a nonuniformly zone-divided image. Specifically, FIG. 8B requires an array having high resolution, but FIG. 8A is satisfied by an array having relatively low resolution. If there are many similar images, it is necessary to improve the discrimination power of the index by enhancing the array resolution.

Therefore, the second embodiment of the image storage and management system adaptively changes the size of grids for each image in the first embodiment to generate an image index including an index size (the number of grids), attribute of each zone (e.g., color component) and array of representative zone numbers.

Figure 9:
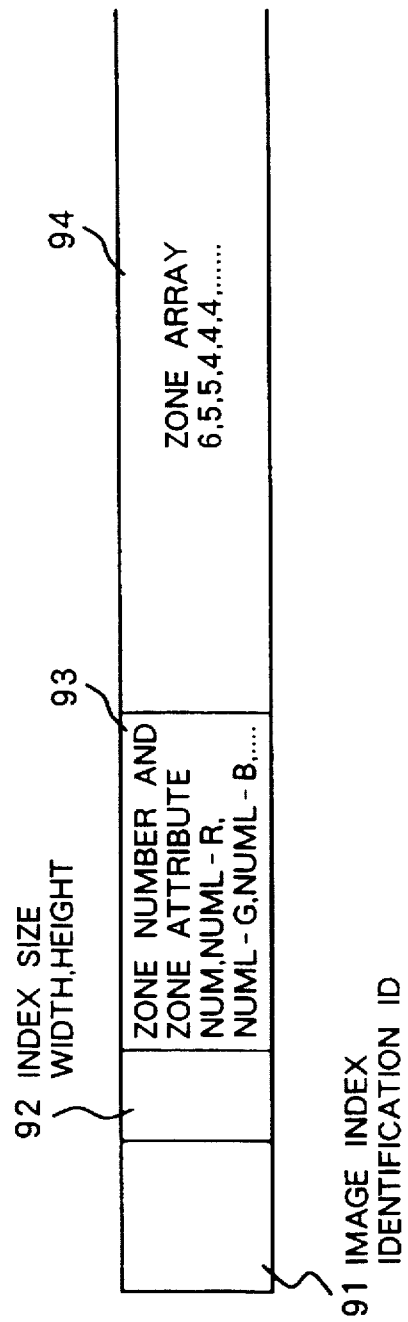
FIG. 9 illustrates an example of an image index.

FIG. 9 shows an example of the image index, illustrating an image index identification ID 91, image index size (the number of grids) 92, attribute information 93 on the number of zones in the index and each zone, and zone array (array of representative zone number) 94.

Thus, description is made of an embodiment of retrieval when the index size is variable. This is to indicate that the size of zone image on the database side is different per image in FIG. 8.

Figure 18:
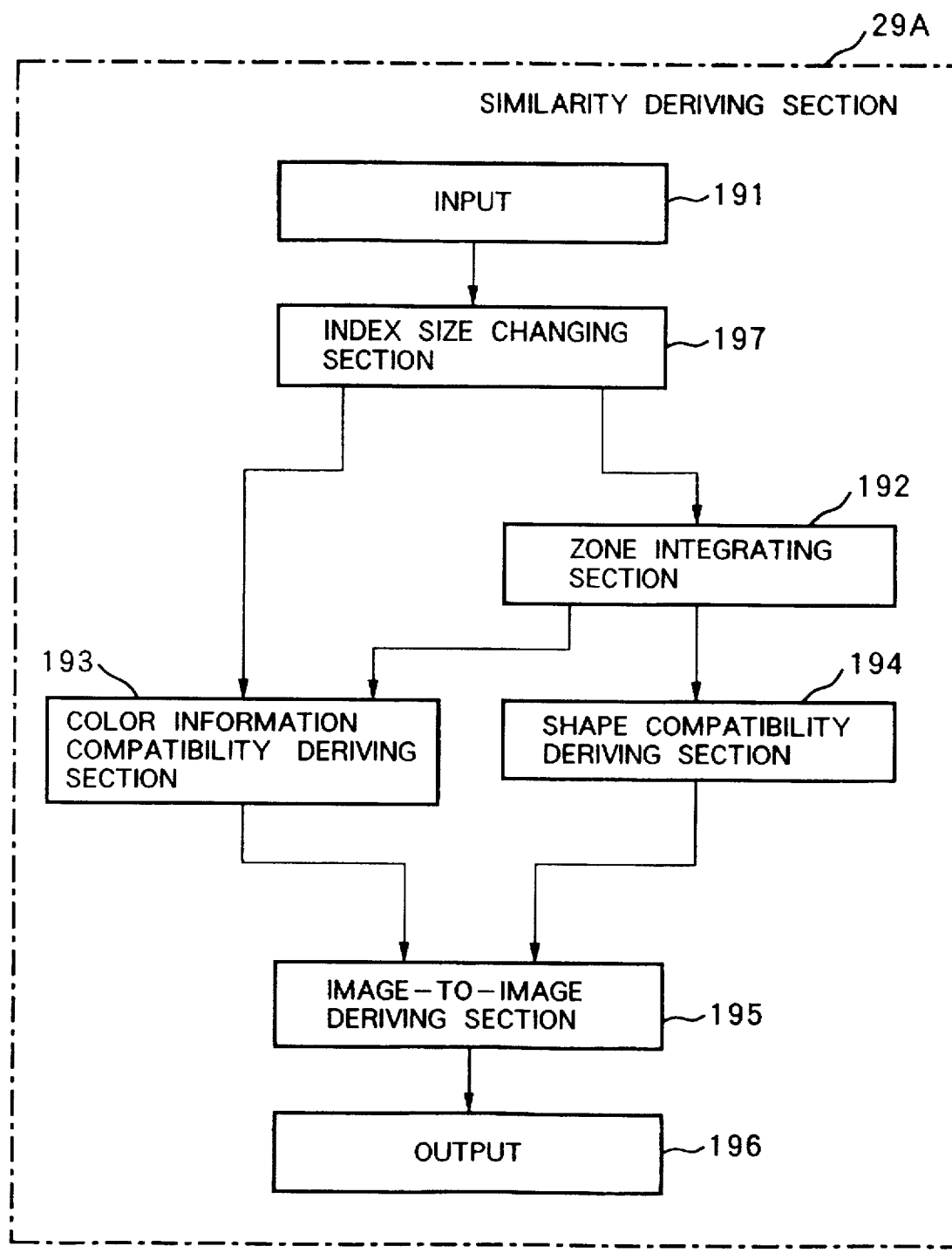
FIG. 18 is a block diagram showing a structure of a similarity deriving section for matching when index sizes are different.

Description will be made of an embodiment of similarity retrieval under circumstances that the image index size is variable per image with reference to FIG. 18 and FIG. 19.

Comparing with the first embodiment shown in FIG. 1, the second embodiment of the image storage and management system has characteristics that the size of block divided by the block divider 24 varies depending on an image, information on the image index stored in the image index storage 26 includes information on the index size obtained by the image index production section 25, and the similarity deriving section 29 can match the image indexes having different sizes.

An adaptive size index production section will be described in detail in an embodiment about an image index production method and system afterward. At this point, FIG. 18 shows an embodiment of a similarity deriving section 29A in which each part can match image indexes having a different size. FIG. 19 shows a process made by the similarity deriving section 29A. The similarity deriving section 29A in this embodiment comprises an input 191, a zone integrating section 192, a color information compatibility deriving section 193, a shape compatibility deriving section 194, an image-to-image compatibility deriving section 195, an output 196, and an index size changing section 197.

When images have a different image index size, similarity can be measured by making the sizes common when matching. The input 191 of the similarity deriving section 29A receives the zone image of an inquired image from the inquiry image input 28 of FIG. 1, and an image index to be matched from the image index storage 26 (Step 2001 in FIG. 19). The size of the inquired zone image is determined by the inquiry image input 28. This size may vary according to the content of the inquired image. When an image in the database is used as an inquired image, the image index size of this image can be used as an image index size.

Figure 19:
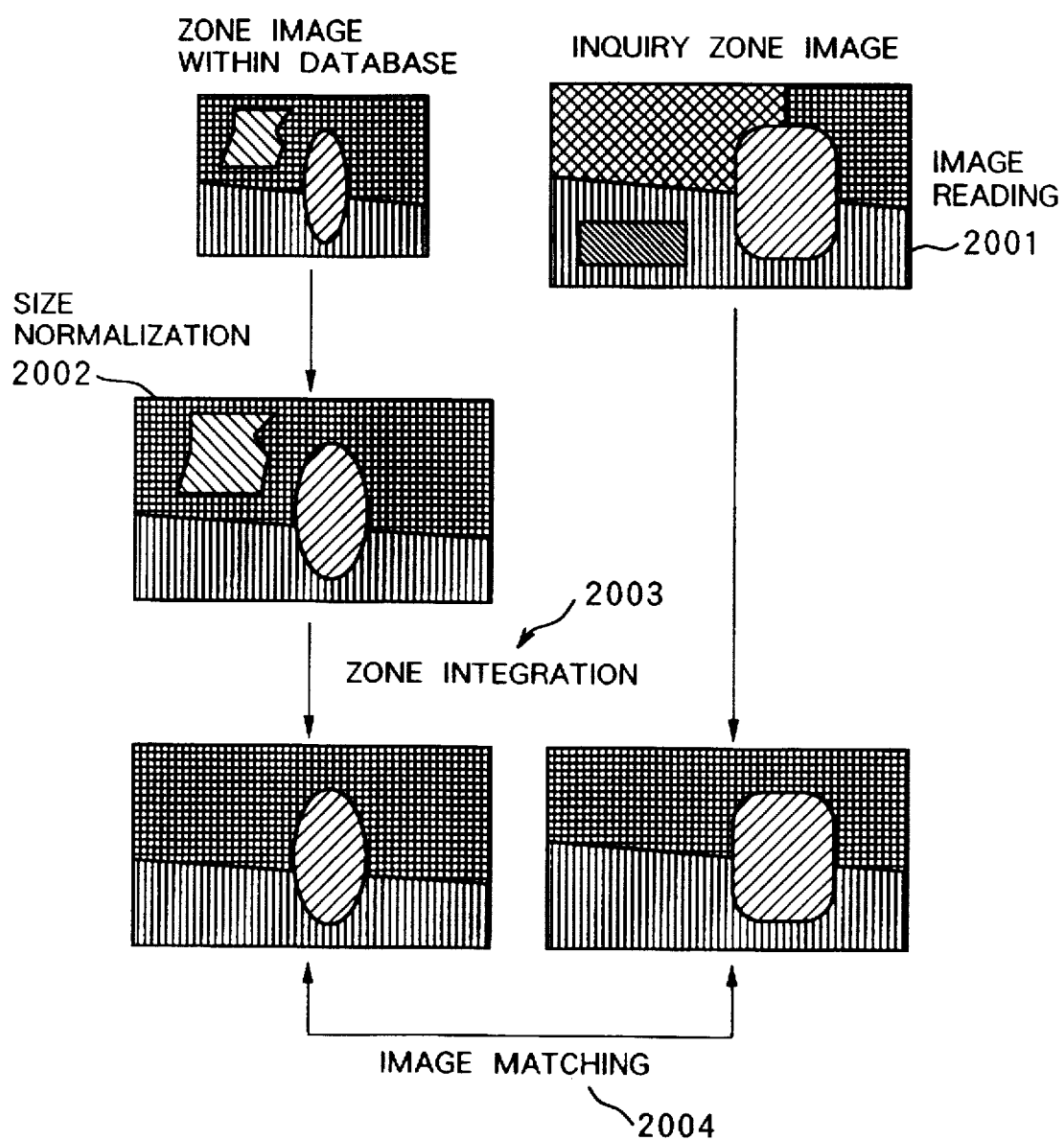
FIG. 19 is a view showing a process by a similarity deriving section for matching when index sizes are different.
Figure 20:
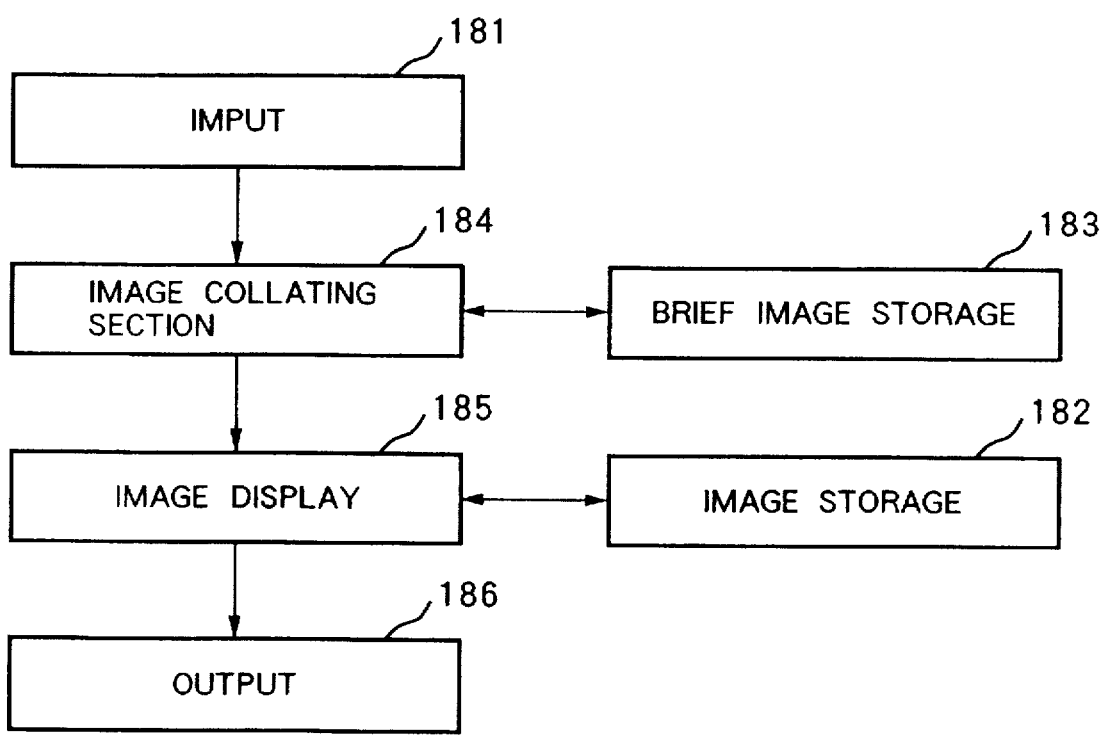
FIG. 20 is a block diagram showing one example of a conventional image retrieval system using a brief image.

In the index size changing section 197, the index size to be compared is made to be identical to an inquired zone image (Step 2002 in FIG. 19). When the index size is larger than the inquired zone image, the index size is thinned to the same size as the inquired zone image. When the index size is smaller than the inquired zone image, the index size is supplemented to the same size as the inquired zone image.

When the inquired zone image and the index zone image are made to have the same size or both zones are integrated to correspond in a one-to-one relationship (Step 2003 in FIG. 19), similarity per zone is measured, and similarity of both images is evaluated by general evaluation (Step 2004 in FIG. 19). For Steps 2003 and 2004 in FIG. 19, the methods disclosed in Japanese Unexamined Patent Publication (Kokai) No. 4-241684 may be used. These methods have been described with reference to FIG. 6 and FIG. 7.

Figure 10:
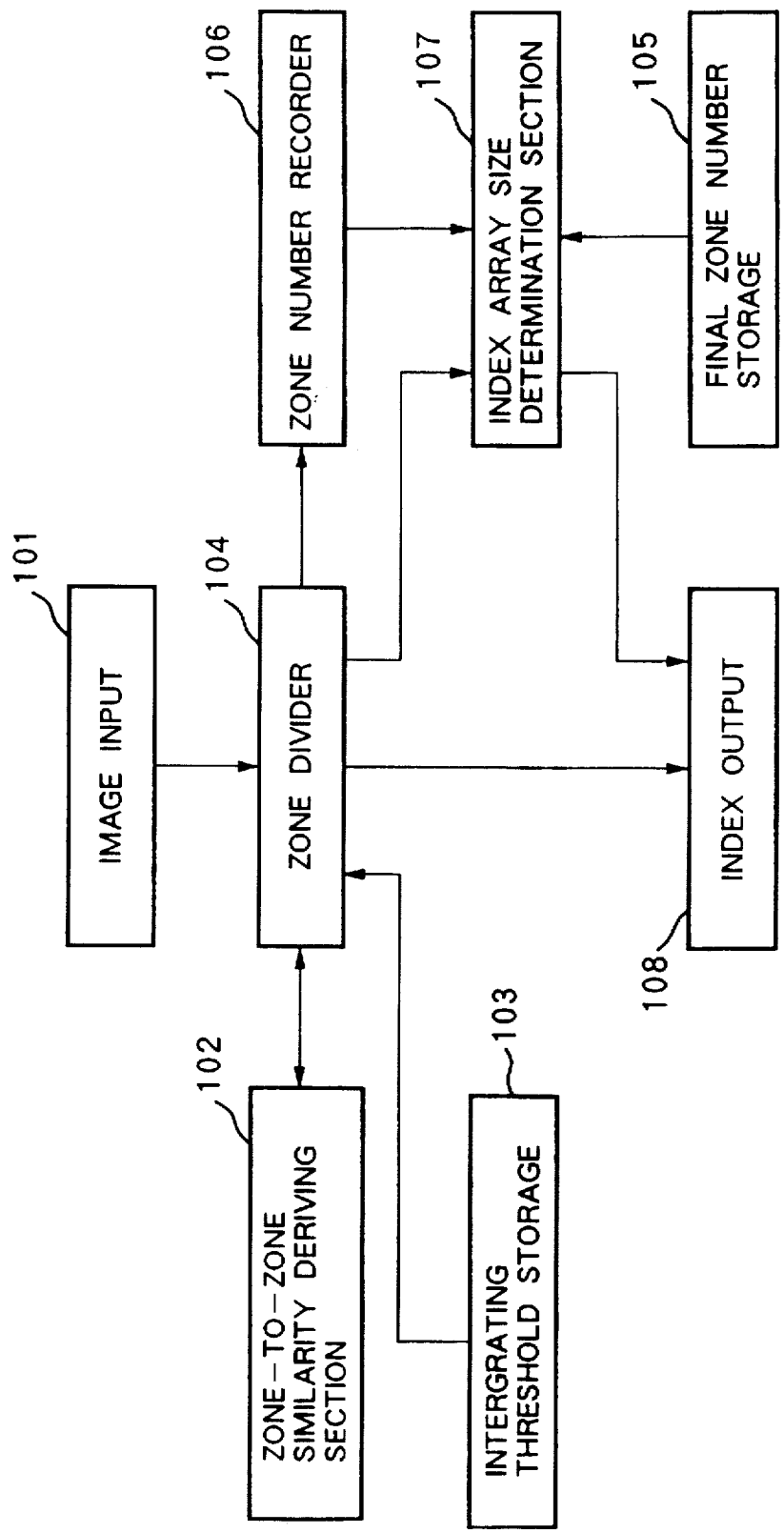
FIG. 10 is a block diagram showing a structure of the first example of an image index production system.
Figure 11:
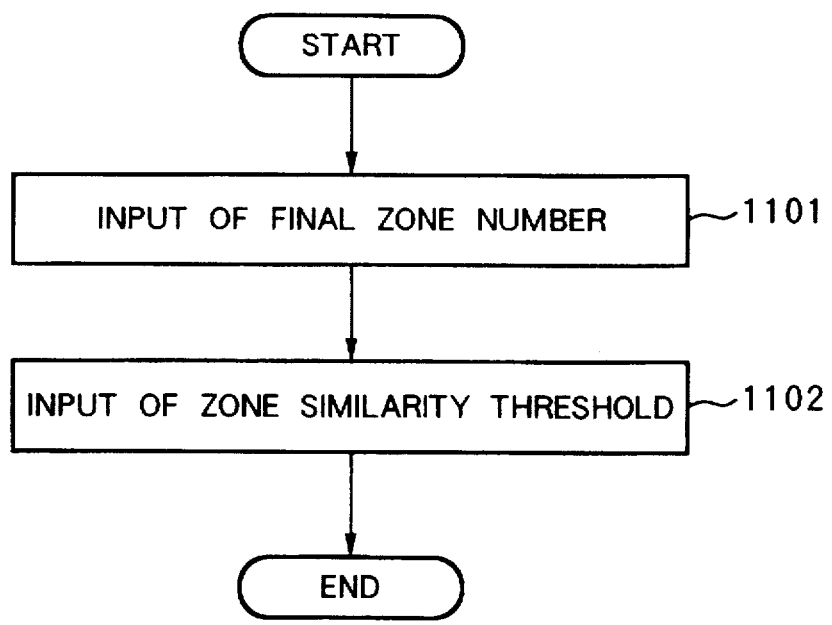
FIG. 11 is a flowchart showing a process of the first example of an image index production system.
Figure 12:
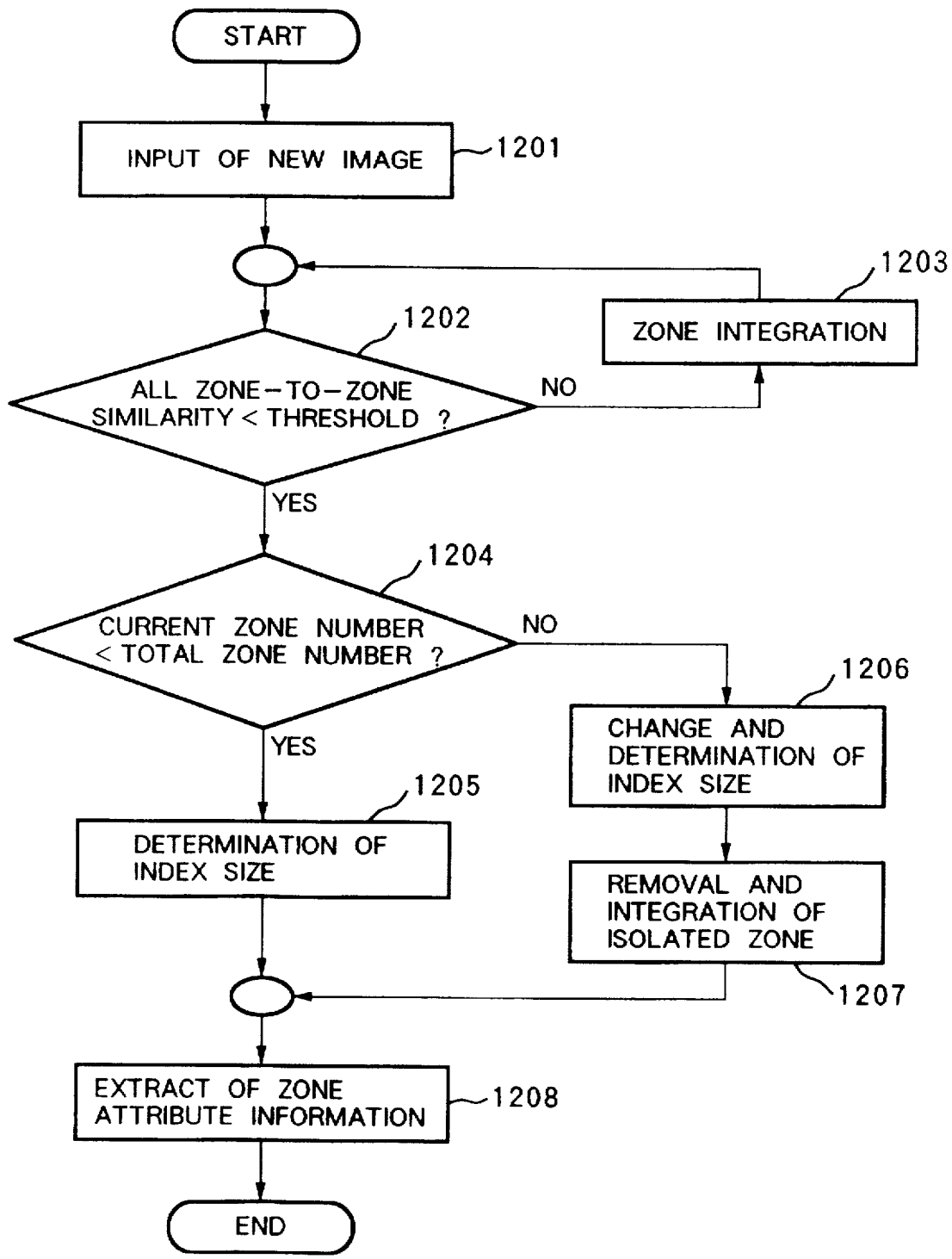
FIG. 12 is a flowchart showing a process of the first example of an image index production system.
Figure 13:
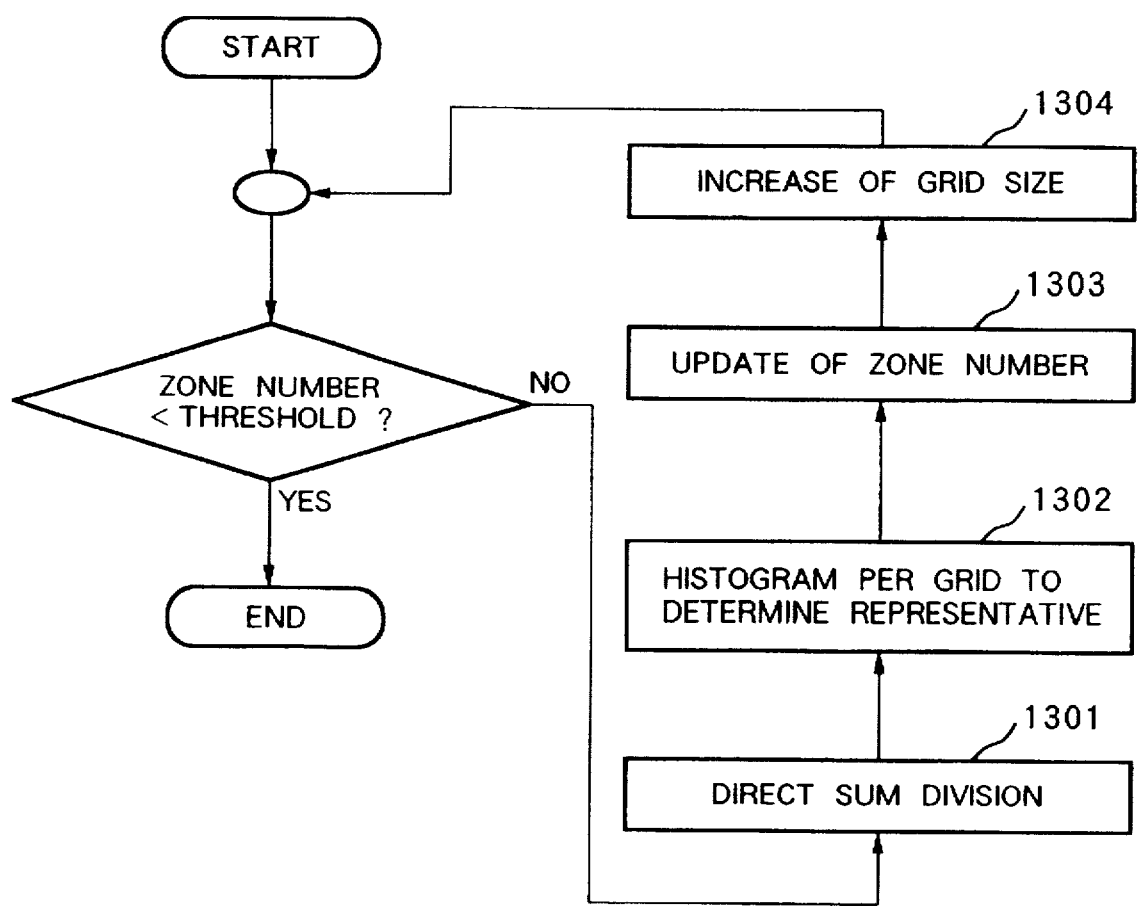
FIG. 13 is a flowchart showing a process by an index array size decision section.

The first embodiment of an image index production system of the invention will be described with reference to FIG. 10 through FIG. 13. FIG. 10 is a function block diagram of an image index production system of the first embodiment, and FIG. 11 and FIG. 12 are flowcharts showing the processes of this embodiment. FIG. 13 is a flowchart for illustrating the process by an index array size determination section in FIG. 10.

As shown in FIG. 10, the image index production system of the first embodiment comprises an image input 101, a zone-to-zone similarity deriving section 102, an integrating threshold storage 103, a zone divider 104, a final zone number storage 105, a zone number recorder 106, an index array size determination section 107, and an index output 108.

The image input 101 enters an original image for producing an image index. The zone-to-zone similarity deriving section 102 receives from the zone divider 104 information on the current divided zones and measures the similarity between zones. The integrating threshold storage 103 stores the threshold entered by a system constructor, which indicates whether or not the integrating process shall be made.

The zone divider 104 receives the similarity between respective zones from the zone-to-zone similarity deriving section 102, and repeatedly integrates the most similar zones until the similarity between respective zones becomes lower than the value possessed by the integrating threshold storage 103. The zone number recorder 106 receives a zone-divided image from the zone divider 104, receives the zone-divided image after the similarity between respective zones has been made lower than the specified threshold by the integrating threshold storage 103, and calculates and stores the number of current divided zones.

The final zone number storage 105 stores the number of final zones provided by a user. The index array size determination section 107 receives zone division information from the zone divider 104, receives the number of final zones from the final zone number storage 105, and if the number of divided zones is larger than the number of final zones, reduces the index size, and determines the size of array. The index output 108 receives the zone-divided image from the zone divider 104, receives the determined array size from the index array size determination section 107, and produces an image index.

Description will be made of the process of the above structured embodiment with reference to its flowchart.

FIG. 11 shows a process previously made by the system constructor on the entire database. The system constructor enters the number of final zones and the zone-to-zone similarity threshold for integrating images (Steps 1101, 1102 in FIG. 11). The values entered are stored in the final zone number storage 105 and the integrating threshold storage 103 shown in FIG. 10.

Specifically, the final zone number storage 105 stores the number of finally divided zones as the image index, and the integrating threshold storage 103 stores the zone-to-zone similarity threshold for integrating zones which are made of one or plural pixels in the image.

A new image to be registered is entered by the image input 101 (Step 1201 in FIG. 12). The zone-to-zone similarity deriving section 102 measures a distance (similarity) between the zones consisting of one or plural pixels in the image.

The zone divider 104 receives the similarity between respective zones from the zone-to-zone similarity deriving section 102, and divides the original image so that the similarity of respective existing zones becomes smaller than a prescribed value (threshold : similarity) to be stored within the integrating threshold storage 103.

For instance, when only color information is used to measure a distance between zones, assuming that RGB values of $(m_1, n_1)$ component and $(m_2, n_2)$ component are $(R_1, G_1, B_1)$ and $(R_2, G_2, B_2)$, a distance between respective pixels is expressed as follows:

$$D_{12}=(R_1-R_2)^2+(G_1-G_2)^2+(B_1-B_2)^2$$

and, the original image is divided by integrating until the boundary for integrating the vector data is lowered to below the threshold by the longest distance method (Steps 1202, 1203 in FIG. 12).

The zone number recorder 106 counts the number of total zones now divided. When the number of present zones is smaller than the number of zones stored in the final zone number storage 105 (Step 1204), the index array size determination section 107 outputs the image size possessed by the zone divider 104 (Step 1205). At the time, the size may be a specific value determined by the system constructor.

When the number of present zones is larger than the number of zones stored in the final zone number storage 105, the array size is contracted to make the number of total zones equal to the number of zones stored in the final zone number storage 105 (Steps 1203, 1204).

Specifically, the index array size determination section 107 receives the number of current zones from the zone recorder 106, receives the number of final zones from the final zone number storage 105, receives the zone-divided image from the zone divider 104, and outputs the size of image index. When the number of stored current zones is equal to or smaller than the number of final zones, the array received from the zone divider 104 is outputted (or a prescribed array size is outputted) (Step 1203).

When the number of current zones is larger than the number of stored current zones, the index array size is determined so that the current image size is contracted, one zone made of one pixel is integrated with other zones around it before contracting to decrease the number of zones, thereby making the total number of zones equal to the one in the final zone number storage 105 (Steps 1206, 1207).

Description will be made of a process (Steps 1206, 1207) for determining the index array size when the number of current zones is larger than the number of stored current zones with reference to FIG. 13.

The zone-divided image received from the zone divider 104 is subject to the direct sum division into a gridded shape (Step 1301), the representative zone number of each block undergone the direct sum division is evaluated by the maximum value of the histogram of the zone numbers within the block (Step 1302), and the number of blocks subject to the direct sum division is decreased (the array number of each grid is increased) to make the types of representative values of zones determined in each block equal to the final zone size (Step 1304).

The index output 108 receives zone information and attribute information from the zone divider 104, receives the array size from the index array size determination section 107, calculates the attribute information on the zone image and zones for the image index, and produces and outputs an index (Step 1208).

As one example of giving attribute information, when color information is used as a zone attribute, the average of colors in the corresponding original image may be obtained and indicated in RGB values.

Figure 14:
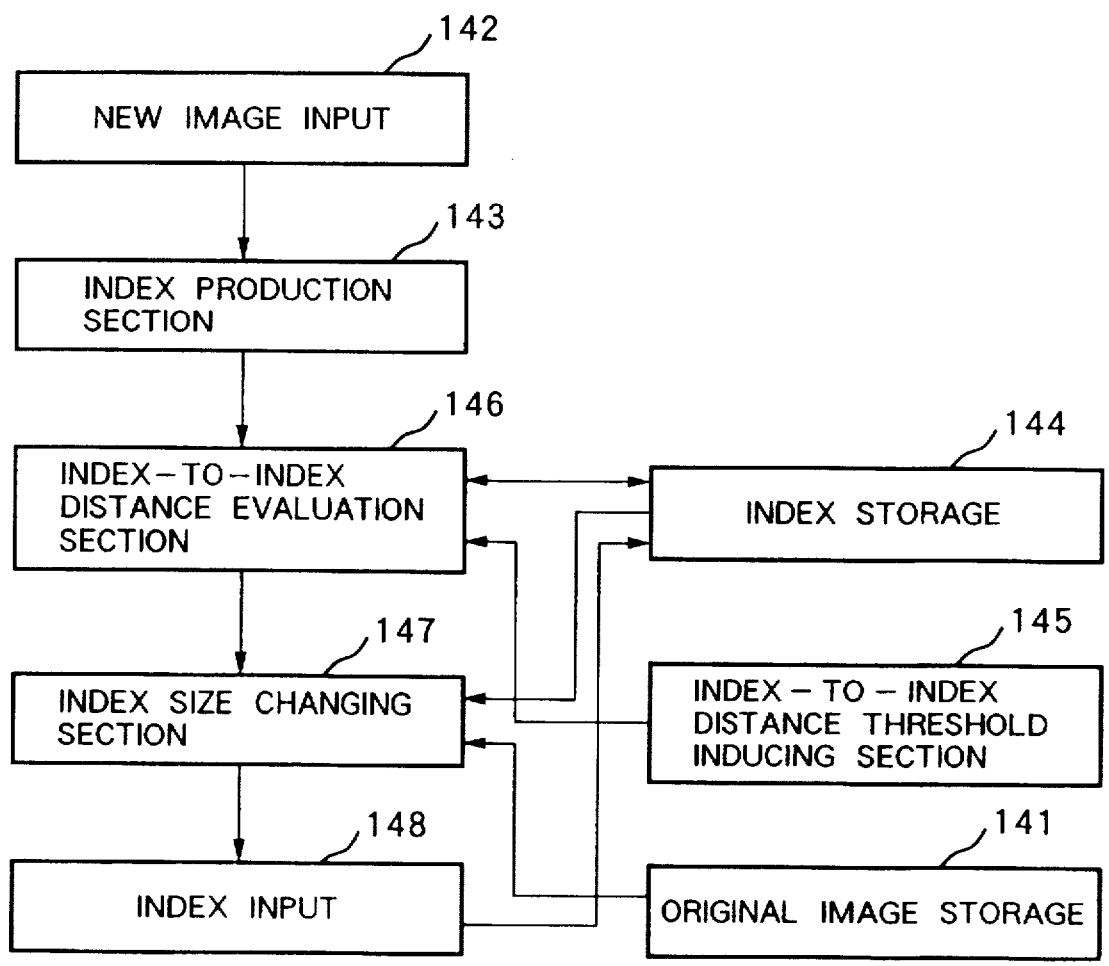
FIG. 14 is a block diagram showing a structure of the second example of an image index production system.
Figure 15:
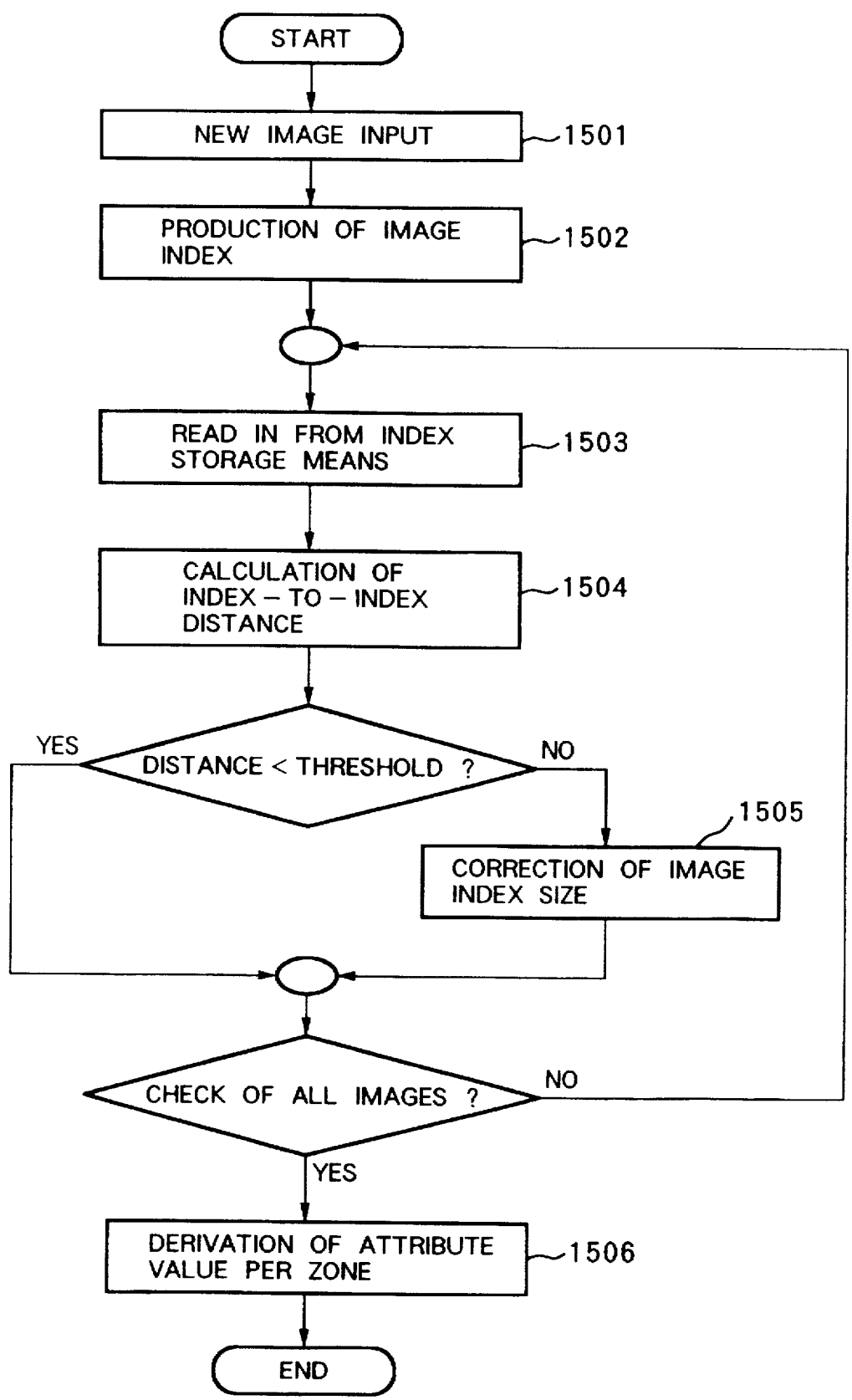
FIG. 15 is a flowchart showing a process of the second example of an image index production system.

Description will be made of the second embodiment of an image index production system of the invention with reference to FIG. 14 and FIG. 15. FIG. 14 is a function block diagram of an image index system of the second embodiment, and FIG. 15 is a flowchart for describing a process of the image index system.

The image index system of the second embodiment comprises an original image storage 141, a new image input 142, an index production section 143, an index storage 144, an index-to-index distance threshold inducing section 145, an index-to-index distance evaluation section 146, an index size changing section 147, and an index input 148.

To keep the discrimination power for information between registered image indexes, this embodiment measures the similarity between a newly registered index and the existing registered index to produce an index so that the similarity between the indexes is below a given value.

The system constructor enters the highest similarity allowable as similarity for indicating a distance between respective indexes, which makes a standard for the discrimination power of information between image indexes. This similarity is determined to be a threshold. Among the distances determined between indexes, the minimum distance (a value which becomes a threshold) for changing the index size is stored. A large distance between indexes indicates low similarity, and a small distance indicates high similarity.

This threshold indicates the upper limit of the similarity between the registered index and the image index to be registered. This threshold is used to determine whether or not the index size is changed.

To make the similarity between the index of an image to be registered and all indexes already registered smaller than the threshold, this embodiment increases the sizes of the index of the image to be registered and the indexes of the registered image. Thus, an image index having a certain discrimination power can be produced. This threshold is provided in the index-to-index distance threshold inducing section 145.

The new image input 142 enters a new image to be registered (Step 1501).

The index production section 143 produces an image index with respect to the entered image. At this time, the image index size may be explicitly given by the system constructor, or may be adaptively set with respect to the image as described in the first embodiment concerning the image index production method and system of the invention (Step 150).

The index storage 144 stores the image index shown in FIG. 9.

The index-to-index distance evaluation section 146 calls the image index from the index storage 144, reads in the threshold from the index-to-index distance threshold inducing section 145 (Step 1503), and measures a distance between all registered image indexes and the indexes produced with respect to the entered images (Step 1504).

The index-to-index distance evaluation section 146 uses the method disclosed in Japanese Unexamined Patent Publication (Kokai) No. 4-241684 as an evaluation scale for a distance between the indexes.

Specifically, the index-to-index distance evaluation section 146 receives a candidate index for new registration from the index production section 143, receives from the index storage 144 the index information on images stored in the original image storage 141, and receives from the index-to-index distance threshold inducing section 145 the threshold which is the upper limit of the similarity between indexes. Thus, the index-to-index distance evaluation section 146 calculates and evaluates a distance from the candidate index for new registration to induce an index from the index storage 14, which is similar to the newly registered index at a level exceeding the threshold.

When the measured index-to-index distance is similar at the level exceeding the threshold, the index size changing section 147 changes the size of the image index with respect to the new image or the size of the image index similar to the image index at a level exceeding the threshold.

To change the size of either image index, the smaller size of the image index is changed. At this time, a corresponding original image is derived from the original image storage 141. To change the index size, there is a process that the number of grids is increased and the array is increased.

Specifically, the index size changing section 147 receives from the index distance evaluation section 146 the evaluated results of the index for new registration and the index which is similar to the index for new registration at a level exceeding the threshold, receives the applicable image index from the index storage 144, receives the corresponding image information from the original image storage 141, and generates an image index with the array size of zone information so that a discrimination distance of each index-to-index distance does not resemble exceeding the threshold.

Figure 16:
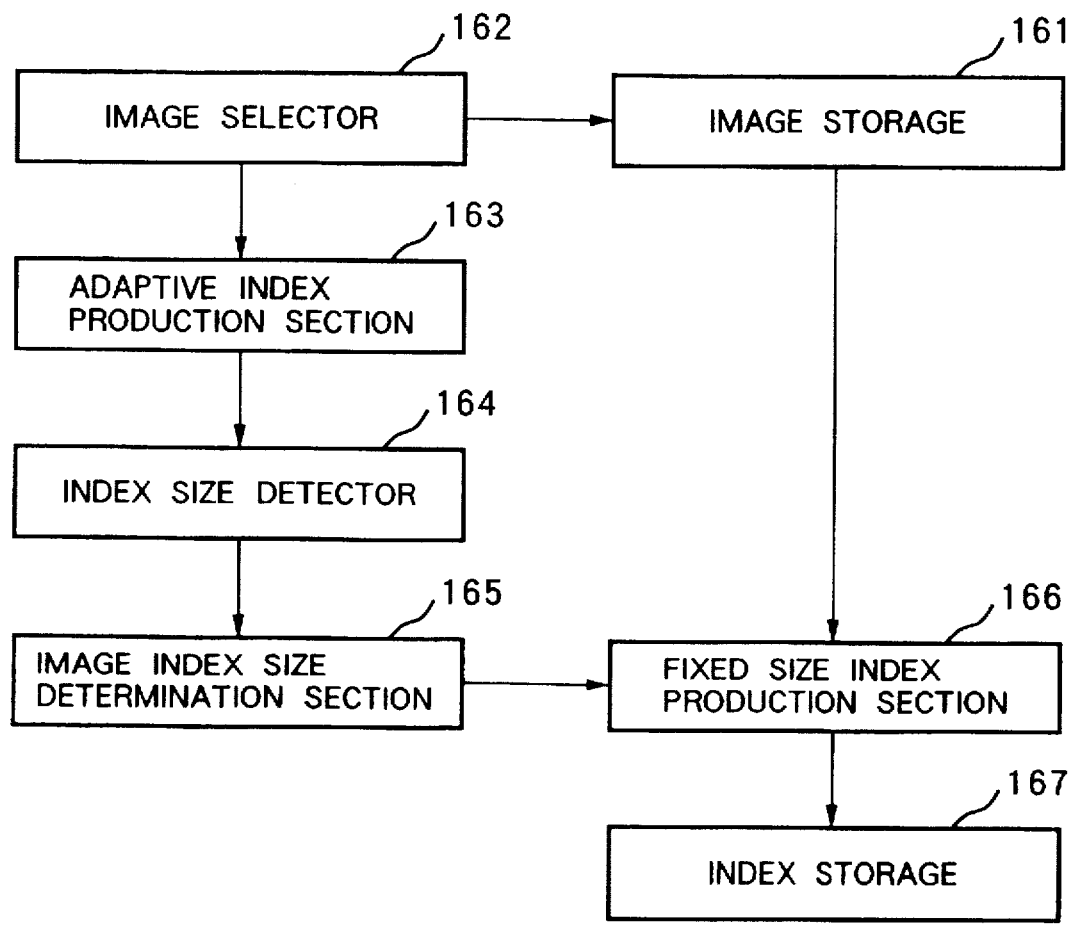
FIG. 16 is a block diagram showing a structure of the third example of an image index production system.
Figure 17:
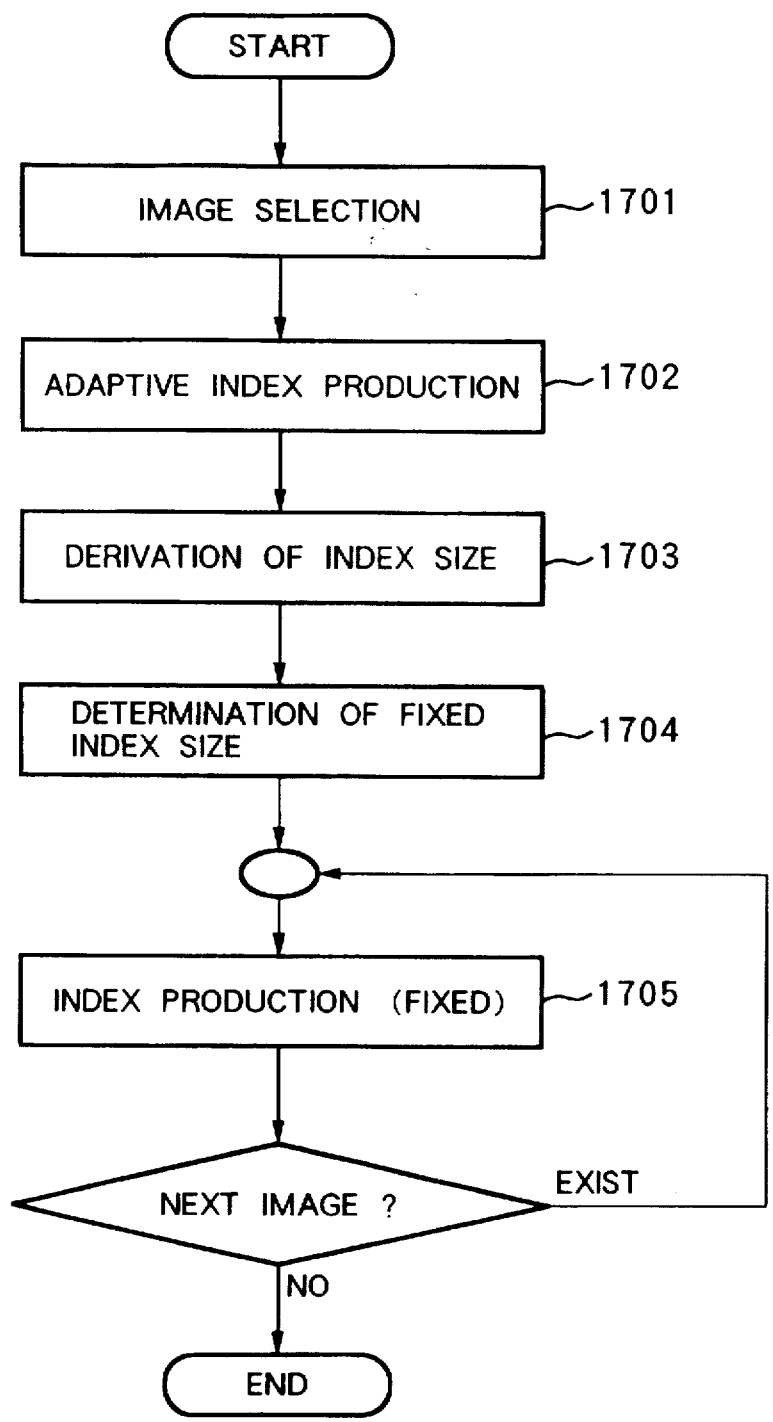
FIG. 17 is a flowchart showing a process of the third example of an image index production system.

The changed image index is sent to and stored in the index storage 144 by the index input 148 (Step 1505). The index input 148 extracts zone attribute information from each zone to store in the index storage 144 (Step 1506). For instance, when color information is used as a zone attribute, the average of colors in the corresponding original image may be obtained and indicated in RGB values. Description will be made of the third embodiment of an image index production system of the invention with reference to FIG. 16 and FIG. 17. FIG. 16 is a function block diagram of the third embodiment of the image index production system, and FIG. 17 is a flowchart showing a process.

The image index system of the third embodiment comprises an image storage 161, an image selector 162, an adaptive index production section 163, an index size detector 164, an image index size determination section 165, a fixed size index production section 166, and an index storage 167.

The invention provides a method for automatically determining an index size to be defined by the system when the index size is required to be fixed.

The image storage 161 stores images for producing an image index. The image selector 162 selects a part or all images from the image storage 161 (Step 1701). The adaptive index production section 163 produces an image index having an optimum size. At this step, the methods of the first and second embodiments of the above-described image signal production system are used (Steps 1702, 1703). The size of the index thus induced is detected by the index size detector 164. As a result, the image index size determination section 165 determines a fixed index size (Step 1704). Examples include the maximum, median and mean values of the detected size. The fixed size index production section 166 produces an image index of the obtained fixed size and stores it in the index storage 167 (Step 1705). For the fixed size index production section 166, the method disclosed in Japanese Unexamined Patent Publication (Kokai) No. 4-307668 can be used.

As described above, the invention can use a visual clue the user has in connection with the image in order to retrieve by the image storage and use system, and can adaptively select an image index in accordance with external conditions such as the number of images entered. And, an effective index size can be provided for the fixed size image index production section, and an image index can be produced easily depending on situations. Thus, a relevance ratio to the retrieval by a user can be improved.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An image index production method comprising the steps of:

receiving an image for new registration and producing an image index;

receiving a candidate image index for new registration, receiving the image index information on original images, calculating a distance from the candidate image index for new registration, and inducing an image index, which is similar to the image index for new registration at a level exceeding the threshold which indicates the upper limit of the similarity indicating a distance between image indexes;

receiving the image index for new registration and the image index which is similar to the image index for new registration at a level exceeding said threshold, receiving original image information corresponding to said image index, and changing an array size to prevent said distance from exceeding the threshold; and receiving the changed image index and renews the image index.

2. An image storage and management system for an image database comprising:

an image input means for entering an original image;

an image storage means for storing said entered original image;

a zone divider means for dividing said image into zones according to the visual characteristics of said image and producing zone division information;

a block divider means for dividing said original image into a grid and producing division information;

an image index production means for receiving said division information and said zone division information, giving a representative zone number to each block of said grid, arranging the representative zone numbers, extracting zone attribute information containing color information of each zone number for said divided zones, and describing image index information; and an image index storage means for storing said image index information, wherein said zone divider means comprises:

means for dividing said original image into a plurality of blocks, means for judging inequalities showing magnitude of changes in contrast of the image per block, contractor means for contracting said original image to change one block into one pixel, means for extracting hue and brightness information from said contracted image, and means for dividing a block, which is judged to have small inequalities, into a prescribed number of zones according to the corresponding hue and brightness information and according to grid coordinate information in said contracted image, and adding information on a block having large inequalities to the divided result to determine a zone-divided image.

3. An image storage and management system as set forth in claim 2, wherein:

a same zone number is given to the pixels having the same attribute information within the same zone, a frequency histogram of pixels belonging to the zones for each block is made, a zone having the maximum number of pixels is determined as the representative zone of the block, and the zone number of said representative zone is determined to be the representative zone number of said block.

4. An image storage and management system as set forth in claim 2, wherein said image index of each original image is described in an array having a different size by changing the number of blocks formed by dividing the original image into the grid according to types of the original image.

5. An image storage and management system as set forth in claim 2, wherein said image index storage means stores at least one image index for at least one original image, and the image storage and management system further comprises:

an original image and index corresponding means for corresponding each of said image indexes with each of said original images, a means for entering an inquiry image for retrieval in index form, a similarity judging means for judging the similarity between an image index of said inquiry image and the image index in said image index storage means and selecting an image index according to the similarity, and a means for specifying the original image corresponding to the selected image index and outputting the original image from said original image and image index corresponding means.

6. An image storage and management system as set forth in claim 5, wherein said similarity judging means comprises:

a zone integrating means for extracting mutually matching zones between the inquiry image and the image index to correspond both images to each other, a means for deriving the similarity of shapes between said corresponded images, a means for deriving the similarity of colors between said corresponded images, and a means for judging the similarity between said inquiry image and said image index according to said similarity between shapes and said similarity between colors.

7. An image index production system comprising:

an image input means for entering original image information;

a zone-to-zone similarity deriving means for measuring the similarity between zones which comprise at least one pixel in an original image;

a threshold storage means for storing a threshold of the similarity for integrating the zones which comprise at least one pixel in the original image;

a zone divider means for receiving the similarity between zones from said zone-to-zone similarity deriving means and the threshold of the similarity from said threshold storage means, and dividing said original image to make the similarity between respective zones lower than the threshold;

a final zone number storage means for storing the number of finally divided zones as an index;

a zone number recorder means for recording the number of total zones of the current image divided by said zone divider means;

an index array size determination means for determining an array size of the zone-divided image from said zone divider means for an image index to make said number of total zones equal to the number of zones stored in said final zone number storage means; and an index output means for calculating attribute information on the zones of said zone-divided image to produce and output an image index.

8. An image index production system as set forth in claim 7, wherein said index array size determination means receives the number of current zones from said zone recorder means, the number of final zones from said final zone number storage means and the zone-divided image from said zone divider means, contracts the number of zones of the current zone-divided image, integrates one zone which is made of one pixel before contracting with other zones around it to decrease the number of zones, and determines the number of total zones to be equal to the number of zones stored in the final zone number storage means.

9. An image index production system as set forth in claim 7, wherein said index array size determination means receives the number of current zones from said zone recorder means, the number of final zones from said final zone number storage means and the zone-divided image from said zone divider means, if said number of current zones is smaller than the number of final zones, determines the zone-divided image from said zone divider means to correspond to the size of the image index, and if said number of current zones is larger than the number of final zones, contracts the number of zones of the current zone-divided image, integrates one zone which is made of one pixel before contracting with other zones around it to decrease the number of zones, and determines the number of total zones to be equal to the number of zones stored in the final zone number storage means.

10. An image index production system comprising:

an original image storage means for storing original image information;

a new image input means for entering a new image;

an index production means for receiving an image to be registered from said new image input means and producing an image index;

an index storage means for storing the image index;

an index-to-index distance threshold inducing means for storing a threshold indicating the upper limit of the similarity showing a distance between image indexes;

an index-to-index distance evaluation means for receiving a candidate image index for new registration from said index production means, receiving from said index storage means the image index information on images stored in said original image storage means, calculating a distance from the candidate image index for new registration, and inducing an image index from the index storage means, which is similar to the newly registered image index at a level exceeding the threshold;

an index size changing means for receiving from said index-to-index distance evaluation means the image index for new registration and the image index which is similar to the image index for new registration at a level exceeding said threshold, receiving original image information corresponding to said image index from said original image storage means, and changing an array size to prevent said index-to-index distance from exceeding the threshold; and an index input means for receiving the image index changed by said image index size changing means and renewing the image index stored in the index storage means.

11. An image index production system as set forth in claim 10, wherein said image index size changing means changes the size of the image index which has a smaller size between the image index for new registration and said image index.

12. An image index production method comprising the steps of:

measuring the similarity between zones which comprise at least one pixel in an original image;

receiving the similarity between said zones and a threshold of the similarity for integrating the zones comprising at least one pixel in the original image, and dividing said original image to make the similarity between respective zones lower than the threshold;

determining a size of said zone-divided image for the image index to make the number of total zones of the current divided image equal to the number of zones to be finally divided as an index; and calculating attribute information on the zones of said zone-divided image to produce and output an index.

13. An image index production method as set forth in claim 12, which further comprises a step of:

reducing the size of the zone-divided array, integrating the array of elements different from the nearby arrays with other arrays, decreasing the number of total zones by contracting to make the number of zones equal to the number of prescribed total zones to thereby producing an index having an adaptive size.

14. An image index production method as set forth in claim 12, which further comprises a step of:

receiving the number of current zones, the number of final zones and the zone-divided image, contracting the size of the current zone-divided image, integrating one zone which is made of one pixel before contracting with other zones around it to decrease the number of zones, and determining the number of total zones to be equal to the number of final zones.

15. An image index production method as set forth in claim 12, which further comprises a step of:

comparing the number of current zones to the number of final zones, wherein if said number of current zones is smaller than the number of final zones, determining the zone-divided image to have a size of the image index, and wherein if said number of current zones is larger than the number of final zones, contracting the number of zones of the current zone-divided image, integrating one zone which is made of one pixel before contracting with other zones around it to decrease the number of zones, and determining the number of total zones to be equal to the number of final zones.

* * * * *